United States Patent [19]

Saito et al.

[11] 3,798,362

[45] Mar. 19, 1974

[54] AUTOMATIC SHUT-OFF DEVICE

[75] Inventors: Teruo Saito; Susumu Ide; Tooru Yasuda, all of Osaka; Shigeru Enomoto, Kyoto, all of Japan

[73] Assignee: Matsushita Electric Industrial Co., Ltd., Osaka-fu, Japan

[22] Filed: May 24, 1972

[21] Appl. No.: 256,293

[30] Foreign Application Priority Data

May 31, 1971 Japan ............................. 46-37946
May 27, 1971 Japan ............................. 46-36862
May 29, 1971 Japan ............................. 46-37364

[52] U.S. Cl. ...................... 178/5.8 R, 178/DIG. 15
[51] Int. Cl. ............................................ H04n 5/44
[58] Field of Search .............. 178/5.8, DIG. 15, 5.6; 325/393, 392, 395; 307/252

[56] References Cited

UNITED STATES PATENTS 3,378,775 4/1968 Joseph ............................... 325/395

*Primary Examiner*—Richard Murray

[57] ABSTRACT

In a television receiver, the rectified power input is applied to the receiver by way of a control device having a control terminal. A phase controlling circuit responsive to the output of the rectifier applies a control signal to the control terminal for stabilizing the voltage applied by way of the control device to the receiver. Circuit means responsive to the reception of signals by the receiver are connected to control the application of the control signals to the control terminal, so that in the absence of received signals, the control signal is not applied to the control device. A time delay circuit is provided to enable energization of the circuit for a predetermined time following the cessation of the reception of signals by the receiver.

10 Claims, 7 Drawing Figures

AUTOMATIC SHUT-OFF DEVICE

BACKGROUND OF THE INVENTION

In conventional television receivers, a manually operated ON–OFF power switch is used to turn on or turn off the television receiver, so that when the television receiver is once turned on, it remains in the reception mode even after the transmission of television programs has been terminated. Therefore, power is wasted. To overcome this problem, there has been proposed a method of using a mechanical timer so as to supply or interrupt the power to a television receiver. However, this method is inconvenient because the viewer must previously check the television program to set the timer so that a television receiver may start the operation at a predetermined time when a desired television program is transmitted. That is, the timer must be set time to time depending upon the desired television programs.

SUMMARY OF THE INVENTION

The primary object of the present invention is to provide a television receiver which may automatically stop its operation after a predetermined time after the broadcasting of the television programs has been terminated opposed to the conventional television receiver of the type employing a mechanical timer so that the latter must be so manually preset as to turn off the television receiver when the broadcasting of the television programs is terminated.

Another object of the present invention is to provide a television receiver of the type which may start the operation as soon as the broadcasting of the television programs is started.

A still another object of the present invention is to provide a television receiver of the type which incorporates a timer which may be constituted of some components of a circuit for automatically stopping the reception of the television receiver so that the latter may be automatically turned off after a predetermined time after opening a switch.

A further object of the present invention is to provide a device for automatically turning off a television receiver in which a third control means is controlled depending upon whether the television signal is being received or not; a second control means is controlled in response to the output of said third control means; and the gate electrode of a first control means is controlled in response to the output of said second control means so that the supply of the output of a rectifier circuit may be interrupted or resumed.

The above and other objects, features and advantages of the present invention will become more apparent from the following description of the preferred embodiments thereof taken in conjunction with the accompanying drawings.

BRIEF DESCRIPTION OF THE DRAWING

Same parts are designated by the same reference numerals throughout the figures.

DESCRIPTION OF THE PREFERRED EMBODIMENTS

Figure 1:
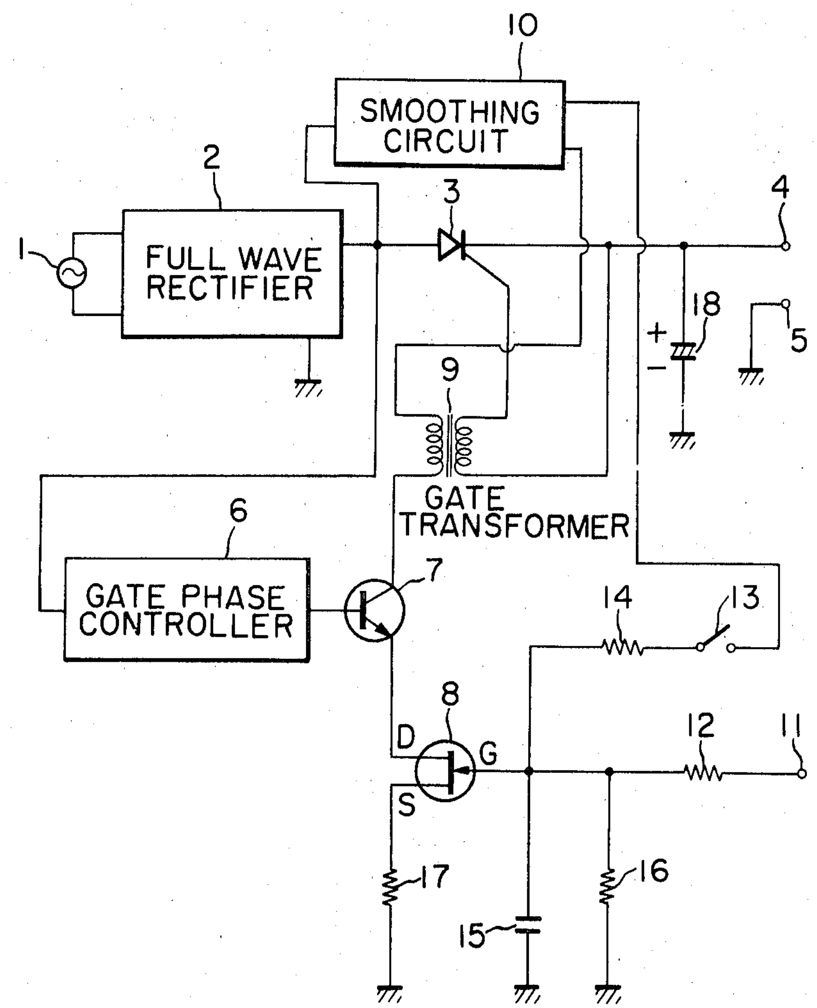
FIG. 1 is a circuit diagram of a first embodiment of the present invention.

Referring first to FIG. 1 illustrating essential component parts of a first embodiment of a television receiver in accordance with the present invention, a full wave rectifier 2 including a diode bridge circuit rectifies the current supplied from a source 1 of electric current of a commercial frequency into the pulsating current with the positive polarity. The anode of a thyristor (registered trade mark of silicon controlled rectifier of General Electric Co. in U.S.A.) 3 is connected to the output terminal of the full wave rectifier 2 whereas its cathode is connected to an output terminal 4 for supplying the DC power to a tuner, an intermediate frequency amplifier, a video detector, an audio circuit and a deflection circuit of a television receiver. The other output terminal 5 is grounded, and a smoothing capacitor 18 is inserted as shown. In response to a pulse generated by a gate phase controller 6, the firing phase of the thyristor 3 is controlled so that the stabilized direct current may be derived from the output terminals 4 and 5. A transistor 7 is connected to the gate phase controller 6 so that the phase control pulse may be amplified and gated. The emitter of the transistor 7 is connected to the drain of a field-effect transistor 8 whereas the collector is connected to a primary of a pulse transformer 9. The output of the full wave rectifier 2 is also applied to a smoothing circuit 10 which generates the direct current normally applied to the primary of the pulse transformer 9. The secondary of the pulse transformer 9 is connected between the cathode and gate of thyristor 3. The vertical or horizontal synchronizing signals are applied to an input terminal 11 which in turn is connected through a resistor 12 to the gate of the field-effect transistor 8. To the gate of the field-effect transistor 8 is also supplied the output of the smoothing circuit 10 through a normally open switch 13 and a resistor 14. A capacitor 15 and a resistor 16 are connected in parallel (this circuit is described hereinafter as CR parallel circuit) between the gate of the transistor 8 and the earth while a resistor 17 is inserted between the source of the field-effect transistor 8 and the earth.

Next the mode of operation of the first embodiment will be described. The power supplied from the AC source 1 is rectified by the full wave rectifier 2 and is applied to the thyristor 3 first control means, the gate phase controller 6 and the smoothing circuit 10. The gate control pulse generated by the gate phase controller 6 is amplified by the transistor 7 and is inverted in phase by the pulse transformer 9 and applied to the gate of the thyristor 3. The firing phase of the thyristor 3 is controlled by the gate pulse so that the DC output power derived between the output terminals 4 and 5 may be controlled. The gate phase controller 6, transistor 7 and pulse transformer 9 form a second control means.

The above described mode of operation is accomplished when the transistor 7 is conducted or ON. The operation of the transistor 7 in turn is controlled by the field-effect transistor 8 which serves as a third control means. That is, when the field-effect transistor is conducting, the output in response to the signal applied to the base is derived from the transistor 7, but when the field-effect transistor 8 is cut off, the transistor is also cut off. Therefore, the mode of operation of the field-effect transistor 8 will be described in more detail hereinafter. When the television signals are being received, the vertical or horizontal synchronizing signals (with the positive polarity) separated by a synchronizing signal separator (not shown) are applied to the input terminal 11 so that the synchronizing signals are applied through the resistor 12 to the capacitor 15. As a result the capacitor 15 is charged so that the gate potential of the field-effect transistor 8 becomes higher than the source potential. Hence the field-effect transistor 8 is conducting, and the transistor 7 is also conducting so that the DC stabilizing circuit including the full wave rectifier 2, the thyristor 3 and the gate phase controller 6 is activated.

When the television signals are not received as, for example, the broadcasting has terminated, no synchronizing signal is applied to the input terminal. Therefore, the capacitor 15 is gradually discharged through the resistor 16 so that at some instant the gate potential of the field-effect transistor becomes equal to the source potential. As a result the field-effect transistor 8 is cut off and the emitter potential of the transistor 7 rises so that the transistor 7 is also cut off. Therefore, no phase control pulse is applied to the thyristor 3 so that the operation of the DC stabilizing circuit or source is stopped.

In order to turn on the television receiver, the normally open switch 13 is closed for some time so that the direct current is supplied to the capacitor 15 through the switch 13 and the resistor 14 from the smoothing circuit 10. As a result the capacitor 15 is charged so that the field-effect transistor 8 is conducted in the same manner described above. Hence the transistor 7 is also conducting so that the gate pulse is applied to the gate of the thyristor 3. Therefore the stabilized direct current is derived from the output terminals 4 and 5 so that the operation of the television receiver is started. Even after the normally open switch 13 is opened, the synchronizing signals are applied to the input terminal 11 so that the field-effect transistor 8 remains in conducting state in the manner described above. Hence the television receiver may continue its operation.

As described above, the operation of the television receiver is automatically stopped after a predetermined time after the program broadcasting is terminated even though the viewer has fallen asleep so that the waste of power may be prevented, the annoying noise produced when no television signal is received may be eliminated and the decrease in performance efficiency of the television receiver may be also prevented. The operation of the television receiver is also automatically stopped when the channel not being used is selected, but will not be stopped when the channel selection is being made because the capacitor 15 cannot be immediately discharged to cut off the field-effect transistor 8.

In the instant embodiment, the vertical or horizontal synchronizing signal is applied to the input terminal 11, but it will be understood that the signals from which the vertical or horizontal synchronizing signal is not separated or the AGC signal may be applied to the input terminal 11. In the instant embodiment, the signals with the positive polarity are applied to the input terminal, but it will be also understood that the negative polarity signals may be applied to the input terminal depending upon the construction of the field-effect transistor 8. Furthermore, instead of the field-effect transistor 8, the bipolar transistor may be used with a high-impedance input circuit.

Figure 2:
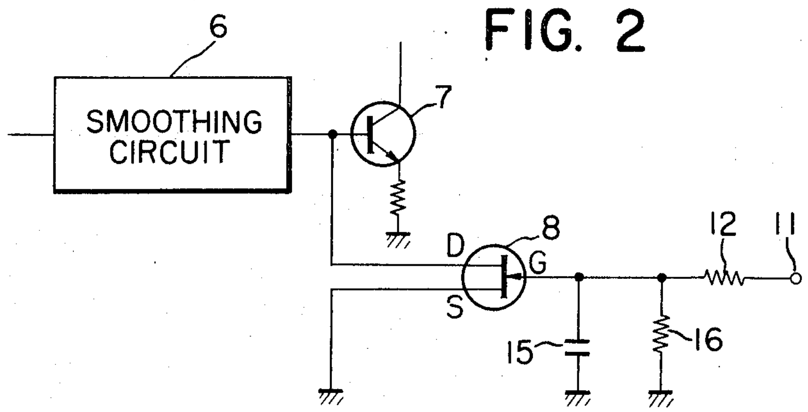
FIG. 2 is a circuit diagram of a variation of the first embodiment shown in FIG. 1.

Next referring to FIG. 2, the second embodiment of the present invention will be described in which the field-effect transistor is cut off when the input signal is applied to the input terminal 11, opposed to the first embodiment in which the field-effect transistor 8 is conducted when the input signal is applied to the input terminal 11. In the second embodiment, the connections of the gate phase controller 6, the transistor 7 and the field-effect transistor 8 are reversed. That is, the drain of the field-effect transistor 8 is connected to the base of the transistor 7. When the input signals are applied to the input terminal 11, the capacitor 15 is charged as described hereinbefore so that the source potential of the transistor 8 is lower than the gate potential. As a result, the field-effect transistor 8 is cut off so that the transistor 7 is conducted to amplify the pulses to be applied to the gate of the thyristor 3. On the other hand when no signal is applied to the input terminal 11 so that the capacitor 15 is discharged through the resistor 6, the source potential of the field-effect transistor 8 equals the gate potential so that the transistor 8 is conducted. As a result, the transistor 7 is cut off.

Figure 3:
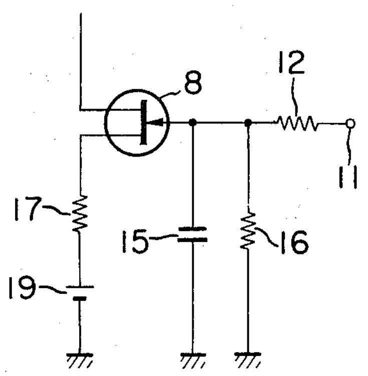
FIGS. 3, 4, 5, 6 and 7 are circuit diagrams of some other embodiments of the present invention respectively.
Figure 4:
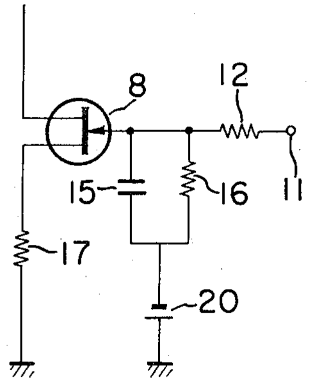

In the third embodiment shown in FIG. 3 and FIG. 4, a DC source is coupled to the source or gate of the field-effect transistor 8 in such a manner that when the capacitor 15 is discharged the gate potential becomes lower than the gate potential. Thus, the field-effect transistor 8 may be more positively conducted and cut off. More particularly, the source of the transistor 8 is connected to the DC source 19. In the fourth embodiment shown in FIG. 4, the gate of the field-effect transistor 8 is coupled to the DC source 20.

Figure 5:
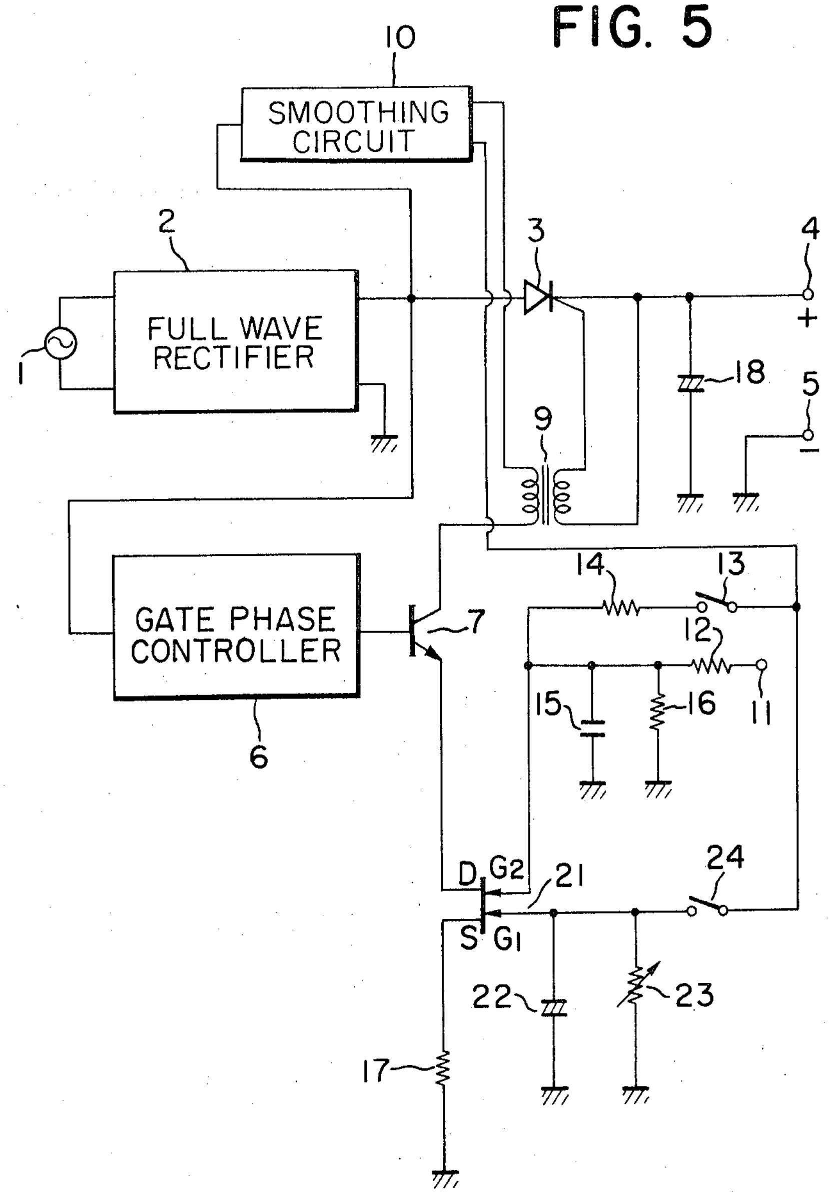

In the fifth embodiment shown in FIG. 5, instead of the field-effect transistor 8 in the first embodiment, a dual gate field-effect transistor 21 is used. The first gate $G_1$ of the dual gate field-effect transistor 21 is coupled to a capacitor 22 with a high capacitance, a variable resistor 23 and to the smoothing circuit 10 through a switch 24. The second gate $G_2$ of the dual gate field-effect transistor 21 is connected in a similar manner to that described in the first embodiment with reference to FIG. 1.

Next the mode of operation of the fifth embodiment will be described, but the description of the direct current stabilizing circuit consisting of the full wave rectifier 2, the thyristor 3, the gate phase controller 6 and the transistor 7 will not be made as it is similar in operation to that described in the first embodiment with reference to FIG. 1 so that only the dual gate field-effect transistor 21 and its associated circuit components will be described. The dual gate field-effect transistor 21 is conducted when and only when the gate potentials applied to both gates are positive. When the field-effect transistor 21 is conducted that the transistor 7 is also conducted so that the stabilized direct current may be derived from the output terminals 4 and 5. However when one or both of the gate potentials are lower than zero, the dual gate field-effect transistor 21 is cut off so that the transistor 7 is cut off. Therefore, no output is derived from the output terminals 4 and 5.

In the reception mode of the television receiver, the switch 24 is closed so that the positive potential is applied to the first gate of the dual gate field-effect transistor 21, so that the latter is controlled by the potential applied to the second gate. More specifically when the capacitor 15 is charged with the input signal applied to the input terminal 11, the potential applied to the second gate of the field-effect transistor 21 is sufficiently high so that it is conducted. Hence the stabilized DC voltage may be derived from the pair of output terminals 4 and 5. When the synchronizing signal is not applied to the input terminal 11 as the television program broadcasting has been terminated, the capacitor 15 is discharged through the resistor 16 so that the potential applied to the second terminal of the field-effect transistor 21 becomes almost zero after some time interval. Therefore the field-effect transistor 21 is cut off so that the output DC voltage is not derived from the output terminals 4 and 5.

When the switch 24 is opened when the television receiver is in the reception mode, the latter may be turned off after some time interval. That is, when the switch 24 is opened, the potential of the first gate of the field-effect transistor 21 is gradually lowered as the voltage charged across the capacitor 22 is charged through the variable resistor 23. When the potential applied at the first gate of the field-effect transistor is lowered to a predetermined level, the latter is cut off so that the operation of the television receiver is stopped. From the above description, it is seen that the time constant circuit comprising the capacitor 22 and the variable resistor 23 functions as a timer which may stop the operation of the television receiver after a time which is determined by the variable resistor 23, after the switch 24 is opened.

As in the case of the first embodiment described with reference to FIG. 2, a variation of the fifth embodiment will be readily made in which the drain of the dual gate field-effect transistor 21 is connected to the base of the transistor 7.

In the embodiments shown in FIGS. 1 – 5, the output applied to the primary winding of the pulse transformer 9 or switch 13 is derived by the smoothing circuit 10 connected to the output of the full wave rectifier, but if required any other power source which is normally activated may be employed.

Figure 6:
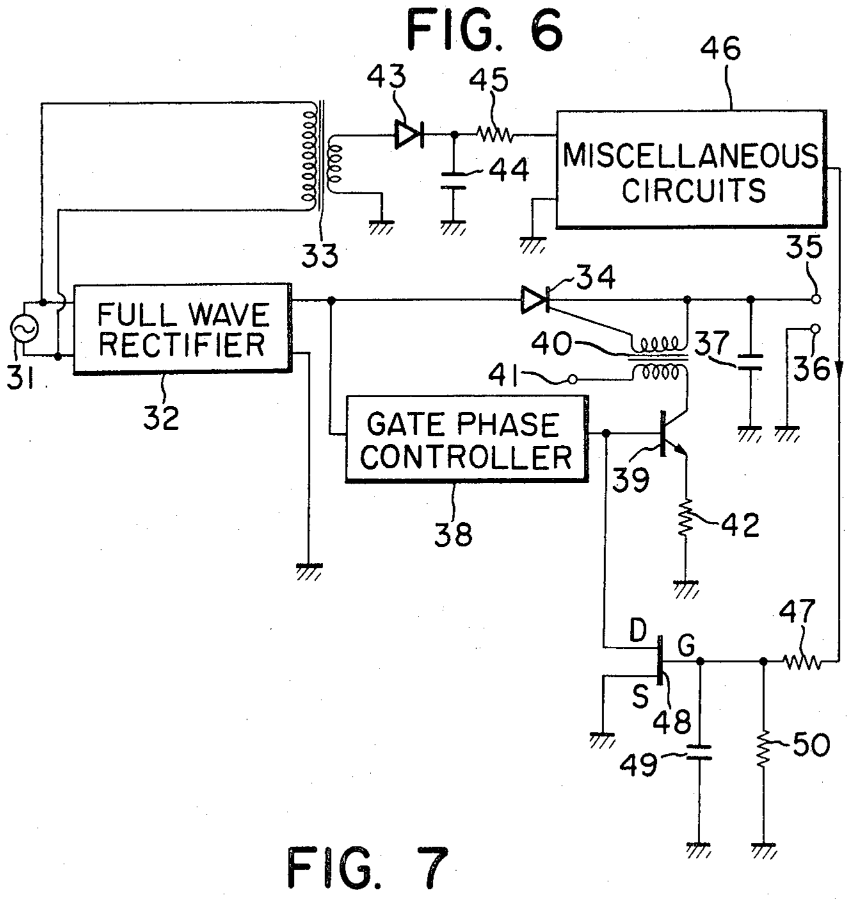

Next referring to FIG. 6, the sixth embodiment of the present invention will be described. The power is supplied from a source of commercial AC power to a full wave rectifier 34 and a power transformer 33. The output of the positive polarity from the full wave rectifier 32 is applied to the anode of a thyristor 34 whose cathode is connected to one of a pair of output terminals 35 and 36. The DC output derived from the pair of output terminals 35 and 36 is supplied to a video output signal amplifier, a deflection circuit and a sound channel of the television receiver. A smoothing capacitor 37 is connected to this circuit. In response to the DC output voltage across the pair of output terminals 35 and a gate phase controller 38 outputs a gating pulse which is amplified by a transistor 39. The collector of the transistor 39 is connected to the primary of a pulse transformer 40 so that the gating pulse whose phase is reversed is applied to the gate of the thyristor 34. The DC voltage is normally applied to a terminal 41, and a resistor 42 is connected to the emitter of the transistor 39. To the secondary winding of the power transformer 33 are connected a rectifying diode 43, a smoothing capacitor 44 and a resistor 45 in order to supply the smoothed direct current to a circuitry 46 including a tuner, an intermediate frequency amplifier circuit, a detector circuit and a synchronizing signal separator circuit. The horizontal or vertical synchronizing signals derived from the circuitry 46 is applied to the gate of a field-effect transistor 48 through a resistor 47. A capacitor 49 and a resistor 50 are connected in parallel between the gate of the field-effect transistor 48 and the earth, and the drain of the field-effect transistor 48 is connected to the base of the transistor 39 whereas the source is grounded.

Next the mode of operation of the sixth embodiment with the above arrangement will be described. The output of the full wave rectifier 32 is applied to the thyristor 34, and the gating pulse generated by the gate phase controller 38 in response to the DC output across the output terminals 35 and 36 is amplified by the transistor 39, reversed in phase by the pulse transformer and applied to the gate of the thyristor 34. Therefore, the stabilized direct current output may be derived from the output terminals 35 and 36. The transistor 39 is controlled by the field-effect transistor 48. That is, when the field-effect transistor 48 is conducted, the base potential of the transistor 39 is lowered so that the transistor 39 is cut off. As a result, no gating pulse is applied to the gate of the thyristor 34 so that no output may be derived from the output terminals 35 and 36. However, when the field-effect transistor is cut off, the transistor 39 is conducted so that the output may be derived from the output terminals 35 and 36. The mode of operation described so far is substantially similar to that of the first embodiment shown in FIG. 1.

The circuitry 46 is normally activated because the DC power is supplied from the rectifier 43 and the smoothing circuit 44 and 45 so that the synchronizing singals are derived from this circuitry when and only when the tuner is tuned to a channel through which the television program is being transmitted. When the television signals are received, the synchronizing signals derived from the circuitry 46 are applied to the capacitor 49 through the resistor 47 so that the capacitor 49 is charged, thus resulting in the increase in the gate potential of the field-effect transistor 48. As a result, the field-effect transistor 48 is cut off so that the transistor 39 is conducting. Hence, the gating pulse is applied to the thyristor 34 so that the DC output may be derived from the output terminals 35 and 36. Therefore the television receiver is turned on.

When no television signal is received, no synchronizing signal is derived from the circuitry 46 so that the charged voltage across the capacitor 49 is discharged through the resistor 50 resulting in the decrease in the gate potential of the field-effect transistor 48. As a result, the field-effect transistor 48 is conducted so that the transistor 39 is cut off. Therefore, no DC output may be derived from the output terminals 35 and 36. Thus, the operation of the television receiver is stopped.

From the foregoing description, it is seen that the operation of the television receiver is automatically controlled depending upon whether the tuner is tuned or not to a channel through which the television program is transmitted.

In the sixth embodiment, it is not required that the DC voltage is applied to the terminal 41 from the separate source. The smoothed output of the full wave rectifier 34 may be applied to the terminal 41. Alternatively the output smoothed by the smoothing circuit 44 and 45 may be applied to the terminal 41. Instead of the field-effect transistor 48, a bipolar transistor with a high input impedance circuit may be used.

Figure 7:
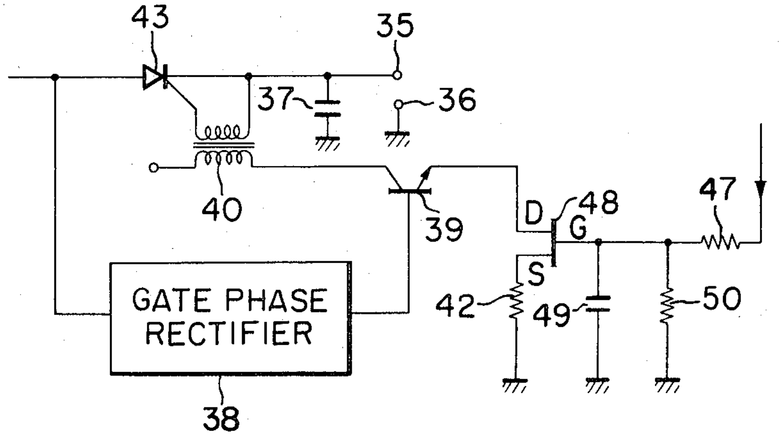

In the embodiment described with reference to FIG. 6, the field-effect transistor 48 is cut off when the television signal is received, but in the variation shown in FIG. 7, the field-effect transistor is conducted when the television signal is received. The field-effect transistor 48 is of the type which is conducted when the gate potential is higher than the source potential but is cut off when the former is lower than the latter. The drain and source of the field-effect transistor 48 is connected between the emitter of the transistor 39 and the resistor 42. In this variation, the field-effect transistor is cut off when the television signal is not received so that the transistor 39 is cut off. As a result, the operation of the television receiver is stopped. On the other hand, when the television signal is received, the field-effect transistor 48 is conducted so that the transistor 39 is also conducted. As a result, the television receiver is turned on.

What is claimed is:

1. A television receiver comprising a rectifier circuit for connection to a source commercial frequency AC voltage, a first control means having a first electrode connected to an output terminal of said rectifier circuit and having a second electrode connected to an output terminal of said first control means, said first control means having a control electrode, a second control means having a control terminal connected to said first electrode of said first control means and having an output terminal connected to said control electrode of said first control means for applying a first control signal thereto, and a third control means connected to said second control means for applying a second control signal to said second control means responsive to the existence of a television signal, whereby power for the receiver at said output terminal of said first control means is automatically supplied or turned off depending upon whether the television signal is received or not.

2. A television receiver as set forth in claim 1 wherein said second control means comprises a gate phase controller having an input connected to the output terminal of said rectifier circuit, a transistor having a base connected to the output of said gate phase controller, and a gate transformer having a primary winding connected to the collector of said transistor and having a secondary winding connected between the gate electrode and said other electrode of said first control means.

3. A television receiver as set forth in claim 1 wherein said third control means comprises a field-effect trnasistor with first and second gates, the first gate being connected to a DC power source through a normally open switch, said switch being closed when the television receiver is turned on, the second gate being connected to the television signal reception section and an RC parallel circuit so that when signals with the same polarity are simultaneously applied to said first and second gates, the field-effect transistor is conducting.

4. A television receiver as set forth in claim 3 wherein said third control means includes an electronic timer circuit comprising a RC parallel circuit connected to said first gate of said third control means for turning off the television receiver after a predetermined time after opening said DC power circuit even when the television signal is transmitted.

5. A television receiver as set forth in claim 1 wherein a smoothing circuit is connected to the output of said rectifier, and to the output terminal of said smoothing circuit are connected an electronic circuit comprising a tuning circuit, an intermediate frequency amplifier circuit connected to said tuner circuit, a detector circuit connected to said amplifier circuit, and a synchronizing signal separator circuit connected to said detector circuit so that control of said third control means may be controlled in response to the synchronizing signal from said electronic circuits representing whether the television signal is received or not.

6. A television receiver as set forth in claim 1, wherein said third control means comprises a field-effect transistor having a gate electrode connected to a television signal reception section and RC parallel circuit and to a DC power source through a normally open switch, said switch being closed only when the television receiver is turned on.

7. A television receiver as set forth in claim 6 wherein the drain of said field-effect transistor is connected to the base of said transistor for rendering said transistor conducting when no television signal is received.

8. A television receiver as set forth in claim 1 wherein said first control means is a thyristor, and said third control means is a field-effect transistor having an output circuit connected to the control terminal of said thyristor through said second control means.

9. A television receiver comprising input rectifier means for connection to an AC power source to provide a rectified power output, a control device for applying said power output to said receiver, said control device having a control terminal, a phase control circuit connected to the output of said rectifier means to produce a first control signal for stabilizing the voltage output of said control device, means applying said first control voltage to said control terminal, means for producing a second control signal responsive to the reception of high frequency signals by said receiver, and means connected to inhibit the application of said first control signal to said control terminal in the absence of said second control signal, said means producing second control signals including time delay means to enable the production of said second control signal for a predetermined time following cessation of reception of said high frequency signal by said receiver.

10. A television receiver comprising input power rectifier means, automatic electronic control means for controlling the energization of said receiver with the output of said rectifier means, signal reception means for sensing the existence of a high frequency signal received by said television receiver, said receiver being connected to apply received signals to said signal reception means, time delay means, a predetermined time delay and connected to said signal reception means, said time delay means being connected to said control means for turning off said television receiver after said predetermined time lapses after the termination of said high frequency signal, and manual switch means connected to control said control means independently of the existence of said high frequency signal.

* * * * *